United States Patent [19]
Espindola et al.

[11] Patent Number: 6,049,414
[45] Date of Patent: Apr. 11, 2000

[54] TEMPERATURE-COMPENSATED RARE EARTH DOPED OPTICAL WAVEGUIDE AMPLIFIERS

[75] Inventors: Rolando Patricio Espindola, Chatham; Thomas Andrew Strasser, Warren, both of N.J.; Jefferson Lynn Wagener, Aberdeen, Wash.; Paul Francis Wysocki, Flemington, N.J.

[73] Assignee: Lucent Technologies Inc., Murray Hill, N.J.

[21] Appl. No.: 09/197,396

[22] Filed: Nov. 20, 1998

[51] Int. Cl.[7] .................. G02B 6/34; H01S 3/30; H04J 14/02
[52] U.S. Cl. ............. 359/337; 359/341; 372/32; 385/37
[58] Field of Search ................... 359/130, 337, 359/341, 569; 372/6, 29, 32; 385/24, 31, 37, 23

[56] References Cited

U.S. PATENT DOCUMENTS 5,042,898  8/1991  Morey et al. .................. 385/37
5,703,978  12/1997  DiGiorvanni et al. ............ 385/37
5,757,540  5/1998  Judkins et al. ................. 359/341

OTHER PUBLICATIONS

Lee et a, OFC '98, Tech. Digest, vol. 2, pp 133–134, Feb. 27, 1998.
Lee et al, IEEE Photonics Tech. Letters, vol. 101 #8, pp 1168–1170, Abstract herewith, Aug. 1998.
Viveh et al, IEEE Trans. a lust. & Meas., vol. 46, #5; abst. only herewith, Oct. 1997.

*Primary Examiner*—Nelson Moskowitz

[57] ABSTRACT

In accordance with the invention, a temperature-dependent rare earth doped waveguide optical amplifier is compensated by a temperature-dependent loss filter. The filter characteristics are designed to be temperature-dependent filters so that the gain characteristic of the amplifier is compensated over a practical operating temperature range. In essence, the amplifier comprises a length of optical waveguide for transmitting optical signals, a rare earth doped amplifying region in the waveguide for amplifying the transmitted optical signals, a pumping source for optically pumping the amplifying region, and a temperature-dependent loss filter. A typical design compensates an EFDA to a variation of less than 1 dB over a temperature range of –40° C. to 85° C. and a spectral range of at least 20 nm.

9 Claims, 4 Drawing Sheets

TEMPERATURE-COMPENSATED RARE EARTH DOPED OPTICAL WAVEGUIDE AMPLIFIERS

FIELD OF THE INVENTION

The present invention relates to rare earth doped optical waveguide amplifiers and, in particular, to temperature-compensated amplifiers and optical communication systems employing them.

BACKGROUND OF THE INVENTION

Rare earth doped waveguide amplifiers, such as erbium doped fiber amplifiers (EDFAs), are important components in optical communications systems. Such amplifiers provide compact means of amplifying optical signals transmitted on waveguides.

A typical rare earth doped waveguide amplifier comprises a length of optical waveguide typically including a central core and a surrounding cladding. A length of the core is doped with atoms of one or more rare earth elements, and the doped length is exposed to pumping light to excite the rare earth dopants. When signal light passes through the core, the signal is amplified by stimulated emission.

A difficulty with conventional rare earth doped amplifiers is that the gain they provide is a function of signal wavelength, and this spectral dependence is, in turn, a function of temperature. In early applications involving only one or a few closely spaced signal channels, these dependencies were of little consequence.

As systems evolved to several channels, the spectral dependence became a matter of concern, and filters were designed to compensate for it. One approach using long period gratings is described in U.S. Pat. No. 5,430,817 issued to A. M. Vengsarkar on Jul. 4, 1995. Another approach using waveguide coupler filters is described in U.S. Pat. No. 5,578,106 issued to C. H. Henry et al. on Jan. 21, 1997. Both of these patents are incorporated herein by reference. Such filters were adequate to compensate a constant-temperature amplifier over a narrow wavelength range.

As contemplated systems have further evolved to many channels over an even wider bandwidth, the temperature dependence of rare earth doped amplifiers has assumed increasing importance. Moreover the filter arrangements used to compensate the spectral dependence of these amplifiers also are temperature dependent, producing complex problems for advanced systems. The problems presented by the widely used erbium doped fiber amplifiers (EDFAs) are instructive.

In the past erbium-doped fiber amplifiers (EDFAs) were rarely filtered to produce a flat gain spectrum since they were naturally flat enough for use in applications with only a few channels. However, systems have been recently announced that include up to 100 signal wavelengths spaced at 50–100 GHz. Such systems require EDFAs with essentially flat gain spectra spanning 20, 40 or even 80 nm. Typically, gain flatness to within 1 dB is desired to minimize accumulated gain excursion between channels. Such flatness at constant temperature can, with challenging effort, be achieved by complementary loss filters [A. M. Vengsarkar et al., Opt. Lett. 21, 336 (1995)].

Many communication systems require that the EDFAs operate over a wide temperature range depending upon the external environment, heat generated inside the EDFA package and heat generated in the proximity of the package. While the gain of erbium in a silicate host has a low temperature dependence, the EDFA gain spectrum changes enough over typical operating temperature ranges to make maintaining flatness within 1 dB very challenging.

The graphical illustration of FIG. 1 shows this problem. Curve 1 is the ideal flat gain spectrum between 1528 and 1563 nm of an EDFA with 20 dB of gain flattened by a hypothetical ideal loss filter. The hypothetical ideal filter is assumed to achieve flatness at 20° C. (room temperature) and is assumed to be constant with temperature. But even with this ideal filter, changes in temperature produce non-uniformities in the gain spectrum. Curves 2, 3 and 4 show the calculated variation induced by temperatures of 0° C., –20° C. and –40° C., respectfully. Curves 5, 6 and 7 show the variation at 40° C., 60° C. and 80° C. (These variations were calculated using the OASIX EDFA Simulation Tool available from Lucent Specialty Fiber Devices.) As can be seen, even an ideal filter could not flatten the gain curve of the amplifier to within one 1 dB over these ranges of wavelength and temperature. Moreover a real filter, rather than an ideal one, would be challenged to flatten to 1 dB even at constant temperature.

One potential solution to the temperature dependence of EDFA gain is to operate the EDFA in a temperature-controlled environment. However, maintaining temperature near the middle of the temperature range (for example 30° C.) is a costly and energy intensive because it requires either the use of both heating and cooling elements or the use of an energy-inefficient thermoelectric cooler (TEC). The easiest solution is to operate the entire device at a constant hot temperature (for example 60° C.) since heaters are cheap and reliable. But hot temperatures create further complications. Many devices such as pump diodes and some passive components are not designed to operate at high temperatures for prolonged periods. Furthermore, most aging processes are accelerated at high temperature. In particular, the loss in most EDFA amplifiers increases as hydrogen diffuses in and reacts with host materials. This process is dramatically accelerated at high temperatures. In short, temperature controlled EDFA packaging can be expensive to implement, energy intensive to operate and detrimental to the performance of the components in the EDFA.

Accordingly there is a need for an improved temperature-compensated optical waveguide amplifier.

SUMMARY OF THE INVENTION

In accordance with the invention, a temperature-dependent rare earth doped waveguide optical amplifier is compensated by a temperature-dependent loss filter. The filter characteristics are designed to be temperature-dependent filters so that the gain characteristic of the amplifier is compensated over a practical operating temperature range. In essence, the amplifier comprises a length of optical waveguide for transmitting optical signals, a rare earth doped amplifying region in the waveguide for amplifying the transmitted optical signals, a pumping source for optically pumping the amplifying region, and a temperature-dependent loss filter. A typical design compensates an EFDA to a variation of less than 1 dB over a temperature range of –40° C. to 85° C. and a spectral range of at least 20 nm.

BRIEF DESCRIPTION OF THE DRAWINGS

The advantages, nature and various additional features of the invention will appear more fully upon consideration of the illustrative embodiments now to be described in the accompanying drawings. In the drawings.

It is to be understood that these drawings are for purposes of illustrating the concepts of the invention and, except for the graphs, are not to scale.

DETAILED DESCRIPTION

This disclosure is divided into two parts. Part I describes an exemplary temperature-compensated waveguide amplifier and its applications. Part II describes the design of the filter structure for this and similar temperature-compensated amplifiers.

I. Exemplary Temperature-Compensated Waveguide Amplifier

Figure 1:
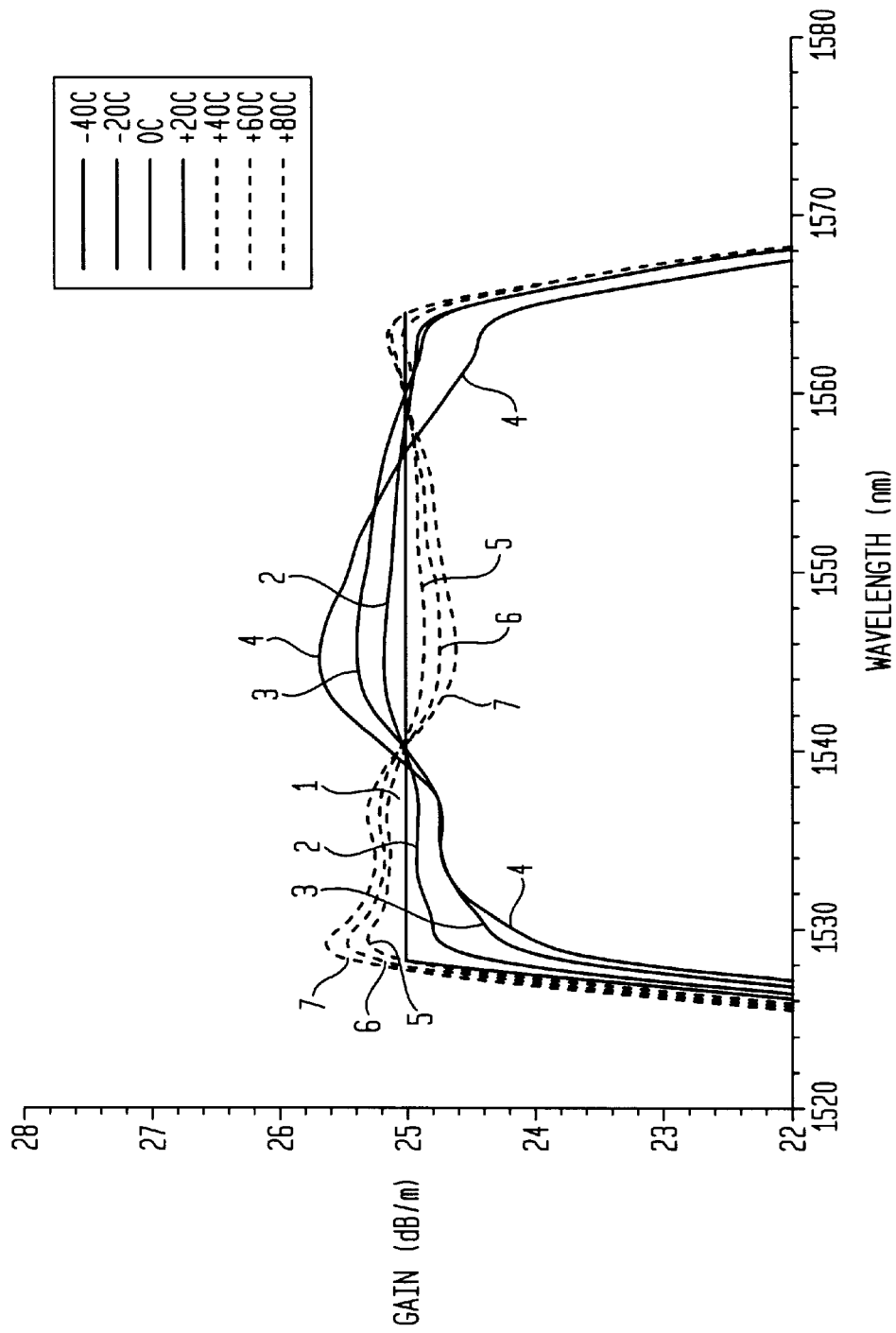
FIG. 1 is a graphical illustration showing the simulated temperature dependence of a typical EDFA compensated by an ideal room temperature loss filter.
Figure 2:
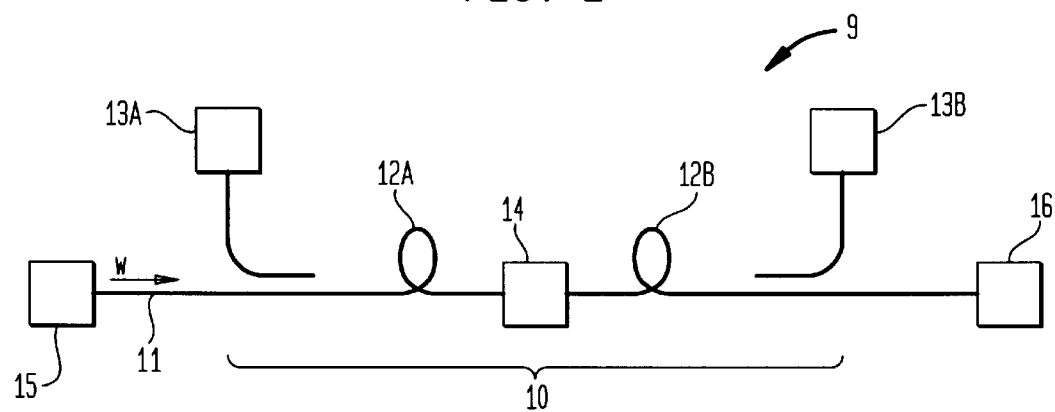
FIG. 2 is a schematic illustration of an optical communication system including a rare earth doped amplifier compensated by a temperature-dependent loss filter.

Referring to the drawings, FIG. 2 schematically illustrates an optical transmission system 9 using a temperature-compensated rare earth doped optical amplifier 10. The system 9 comprises an optical transmitter 15 for transmitting optical signals within a given bandwidth W, a length of optical waveguide 11, here an optical fiber, and an optical receiver 16. The waveguide 11 includes an amplifier 10 comprising at least one rare earth doped amplifying region for amplifying the transmitted optical signals. In this embodiment the amplifier 10 comprises two amplifying regions 12A and 12B which are advantageously erbium-doped fiber amplifier stages. Each amplifying region has a gain versus wavelength characteristic which is spectrally dependent over range W of wavelength and temperature-dependent over a range R of operating temperature.

At least one pumping source is provided for optically pumping the amplifying regions. Here there are two pumping sources 13A and 13B, one for each amplifying region.

Optically coupled to waveguide 11 in the path of the transmitted signals is a temperature-dependent loss filter 14 for passively compensating the gain spectrum of the amplifying regions over the bandwidth W and the temperature range R. In this embodiment, the filter 14 is disposed at the output of amplifying region 12A. This location provides the highest optical output power and the lowest noise figure. Advantageously, the filter 14 compensates the amplifying regions to a variation of less than 1 dB over a temperature range R of −40° C. to 85° C. and a spectral range W of at least 20 nm and preferably greater than 40 nm.

It should be noted that, depending on the need for power or low noise factor, the EDFA can have any number of stages and one or a plurality of filters. Filters can be before the first EDFA stage, between EDFA stages or after the last EDFA stage.

Loss filter 14 preferably comprises a plurality of long period gratings each having different temperature-dependent loss versus wavelength characteristics. The plurality of filters has an aggregate temperature-dependent loss characteristic compensating the amplifying region(s) over a practical range of operating temperatures.

The materials, dimensions and grating spacings for a set of four suitable gratings as fabricated in commercial AT&T dispersion shifted fiber (DSF) are set forth in Table 1 below:

TABLE 1

| Filter # | Period (mm) | Length (mm) | UV index change | Center Wavelength (nm) | Peak Loss (dB) |
|---|---|---|---|---|---|
| 1 | 460 | 52.5 | $1.46 \times 10^{-4}$ | 1531.2 | 2.08 |
| 2 | 461 | 48.0 | $1.45 \times 10^{-4}$ | 1532.8 | 2.0 |
| 3 | 350 | 27.27 | $2.20 \times 10^{-4}$ | 1546.2 | 2.5 |
| 4 | 352 | 25.45 | $3.05 \times 10^{-4}$ | 1557.3 | 3.5 |

II. Filter-Design Considerations

Applicants' approach to amplifier design is to design compensating temperature dependence into the amplifier loss filter. A preferred approach is to provide a plurality of concatenated filters having center wavelengths which spectrally shift with temperature to compensate temperature-dependent shifts in the gain of the amplifier. The rate and direction of such center wavelength shifts is specified by a shift coefficient.

Long period gratings with predetermined negative or positive shift coefficients of different magnitude can be made by the techniques described in G. W. Yoffe et al., Applied Optics, Vol. 34, p. 6859–6861. While the technique was there used to design gratings with zero shift, the same technique can be used to design positive shifts and negative shifts of desired magnitude.

Bragg gratings and long period gratings can also be provided with negative or positive shift coefficients by packaging with positive or negative CTE materials which passively change the fiber strain with temperature. See G. W. Yoffe et al., cited above. While the technique was there used to design Bragg gratings, the same technique can be used to design long period gratings. The temperature dependence of the center wavelength of a grating packaged in this manner ($d\lambda/dT$) can be shown to be:

$$d\lambda/dT = d\lambda_o/dT + (d\lambda/d\epsilon)(d\epsilon/dT)$$

where $d\lambda_o/dt$ is the temperature dependence of the shift in center wavelength of the unpackaged grating, $d\lambda/d\epsilon$ is the strain dependence of the shift in center wavelength of the grating, and $d\epsilon/dT$ is the strain change on the grating as induced by the package. Through package design to control $d\epsilon/dT$, the temperature dependence of the packaged grating can be controlled to have virtually any center wavelength dependence within limits of the mechanical strength of the fiber and package.

By providing a plurality of concatenated filters with a respective plurality of different shift coefficients, one can achieve a composite filter with a loss characteristic that evolves with temperature. By design and choice of the filters, one can fabricate a composite loss filter that maintains desired flatness of a rare earth doped amplifier even as the operating temperature changes.

Before discussing a specific exemplary design, the following general considerations should be noted.

(a) The ideal filtered rare earth doped amplifier would allow perfect flatness over all required wavelengths in W and, over all temperatures in R for the same overall gain. However, it is often good enough to have flatness with a variable gain.

(b) If the actual gain and flatness must be both maintained in an amplifier over all operating conditions, a variable optical attenuator (VOA) can be added within the amplifier. Then, when the amplifier itself needs to produce more gain to achieve flatness, the variable attenuation can be increased so that the overall gain is maintained while flatness is achieved.

(c) Filters can be made to shift not only their center wavelengths but also their bandwidth and/or magnitude with temperature. For example, packaging a long-period grating in a bend configuration rather than in a straight line will cause complex band shape changes as a temperature changes the bend.

The initial step in the preferred design procedure is to design or choose a starting point filter. Applicants choose as a starting point a composite long period grating composed of four concatenated long period grating components. The EDFA fiber was MP980, marketed by Lucent Specialty Fiber Devices with a numerical aperature of 0.22, a cutoff wavelength of 880 nm, a peak erbium loss of 6.1 dB/m near 1530 nm (corresponding to an estimated erbium concentration of $8.8 \times 10^{24} m^{-3}$) and about 12 M % Al codoping. The composite filter, was designed to flatten the gain spectrum of an EDFA at 20° C. The structure of this filter is summarized in previous TABLE 1.

The result achieved by the composite filter at 20° C. is 24.56 dB gain with a flatness to 0.486 dB. The performance parameters of each of the four components is set forth in column 1 of Table 2.

TABLE 2

Results: Note parenthesis show center pm/° C. center shift required or %/° C. magnitude or width shift (as appropriate)

| Result achieved | 20 C Best 24.56 dB gain 0.486 dB flatness | 60C, same gain 20C filter 24.57 dB gain 1.337 dB flatness | 60C, tilted 20C filter 23.60 dB gain 0.830 dB flatness | 60C same gain centers moved 24.54 dB gain 0.992 dB flatness | 60C, same gain wid/dep change 24.56 dB gain 0.40 dB flatness |
|---|---|---|---|---|---|
| Fil 1 Center | 1531.2 | 1531.2 | 1531.2 | 1530.7 (−12) | 1531.2 |
| Fil 1 Mag | 2.08 | 2.08 | 2.08 | 2.08 | 2.08 |
| Fil 1 Width | 5.39 | 5.39 | 5.39 | 5.39 | 7.15 (0.8%/° C.) |
| Fil 2 Center | 1532.8 | 1532.8 | 1532.8 | 1532.9 (−3) | 1532.8 |
| Fil 2 Mag | 2 | 2 | 2 | 2 | 2 |
| Fil 2 Width | 5.92 | 5.92 | 5.92 | 5.92 | 7.70 (0.75%/° C.) |
| Fil 3 Center | 1546.2 | 1546.2 | 1546.2 | 1545.5 (−18) | 1546.2 |
| Fil 3 Mag | 2.5 | 2.5 | 2.5 | 2.5 | 2.2 (0.3%/° C.) |
| Fil 3 Width | 11.90 | 11.90 | 11.90 | 11.90 | 11.41 (0.1%/° C.) |
| Fil 4 Center | 1557.3 | 1557.3 | 1557.3 | 1557.5 (5) | 1557.3 |
| Fil 4 Mag | 3.5 | 3.5 | 3.5 | 3.5 | 3.5 |
| Fil 4 Width | 12.42 | 12.42 | 12.42 | 12.42 | 12.42 |

The next step is to use the known temperature dependence of EDFA spectra to ascertain the error produced when the EDFA temperature changes, e.g. to 60° C. This particular starting filter can be modeled as temperature insensitive filter design over this range. The top row shows the average gain across wavelength attributed to the EDFA and filter alone, without any VOA loss. Hence the same total gain for an EDFA with a VOA included would be achieved by having 0.96 dB more VOA loss at 20° C. (Col. 1) and removing it as temperature rises to 60° C. (Col. 3). (Compare 24.56 dB gain to 23.60 dB gain).

Column 2 of Table 2 gives the predicted results (OASIX simulation). Column 2 shows that the thermally stable long period grating loses flatness with temperature increase.

The third step is to consider the use of a variable attenuator to tilt the resulting gain spectrum at the changed temperature (60° C.). The results, shown in Column 3 of Table 2, reduce the flatness from 1.337 dB untilted to 0.830 dB tilted.

Figure 3:
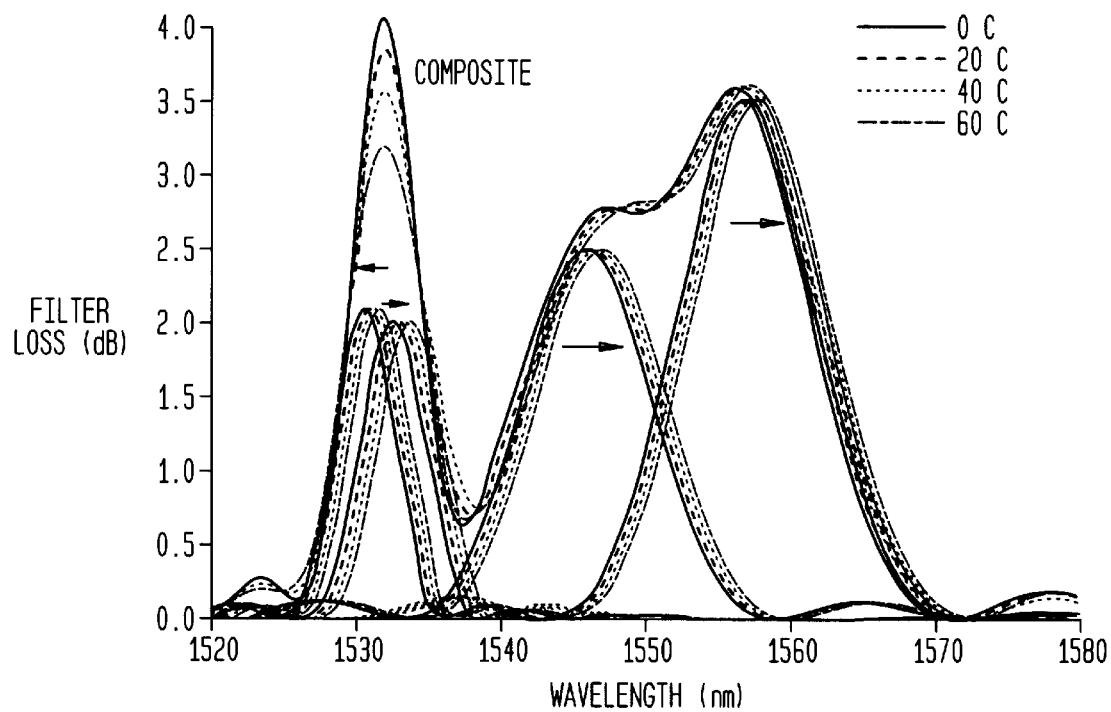
FIGS. 3 and 4 are graphical illustrations showing the loss versus wavelength characteristics of temperature-dependent compensating loss filters and their components.
Figure 4:
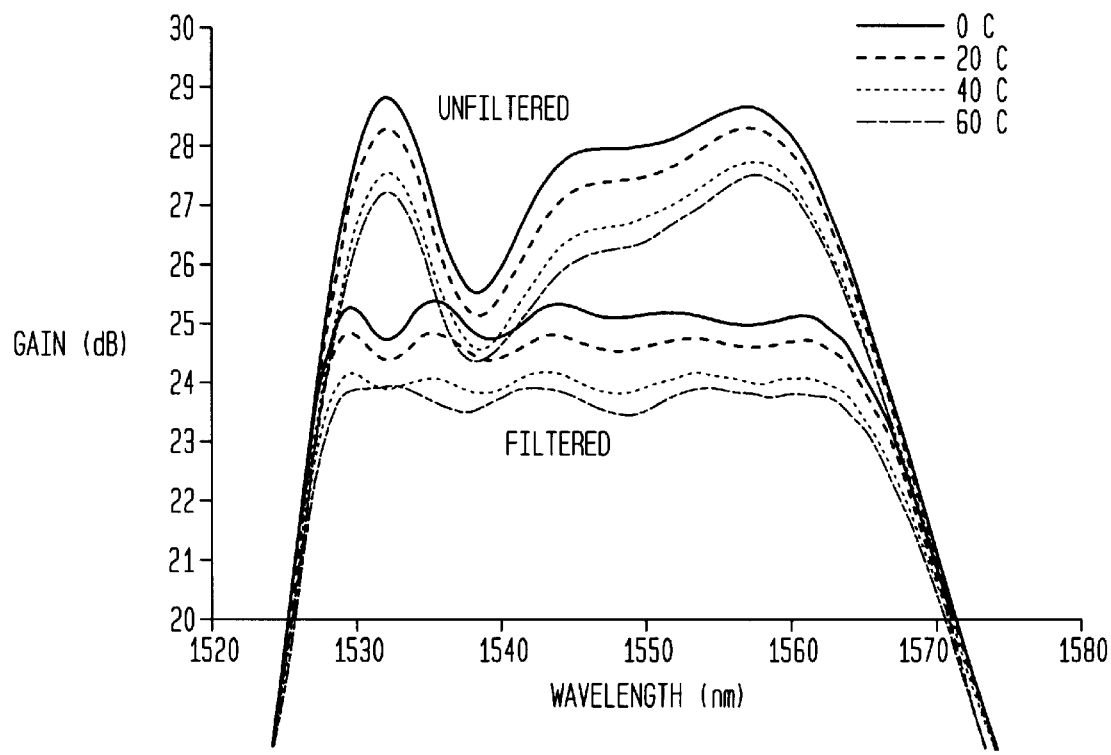

The next step is to consider variation of the individual filter components. A preferred parameter to vary and optimize is the individual center wavelengths. The results are shown in Column 4 of Table 2. FIG. 3 shows the characteristics and shift directions for the component and composite filters, and FIG. 4 shows the filtered and unfiltered amplifier gain spectra.

Figure 5:
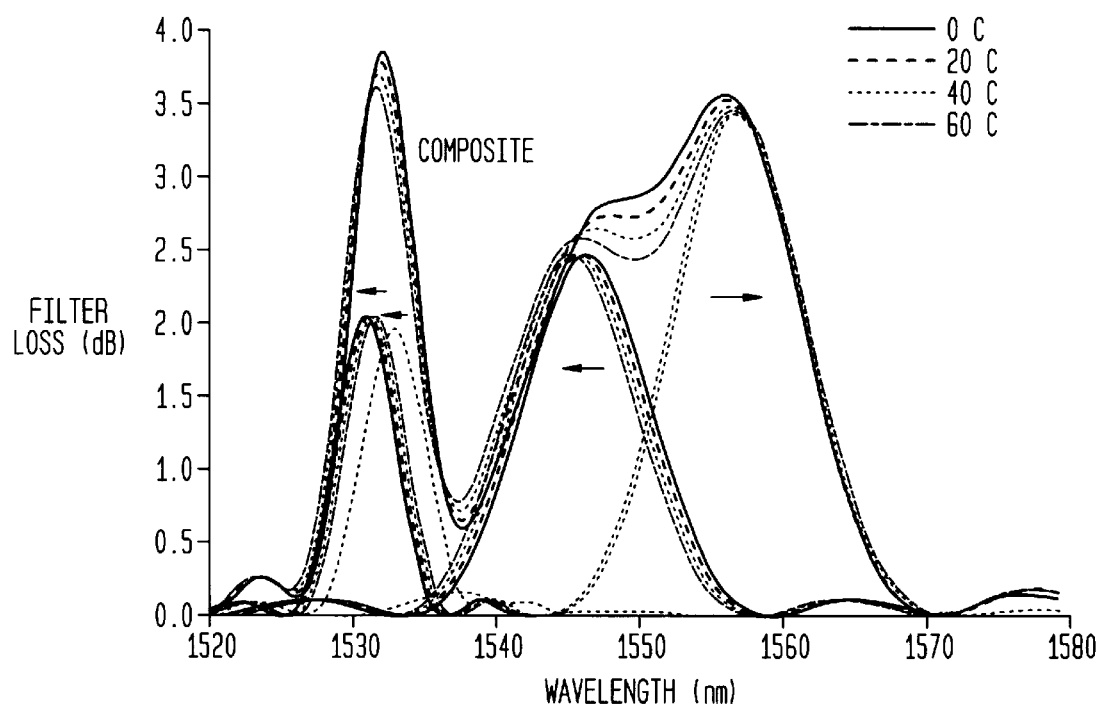
FIGS. 5 and 6 are graphical illustrations showing the gain spectra of filtered amplifiers in comparison with corresponding unfiltered amplifiers.
Figure 6:
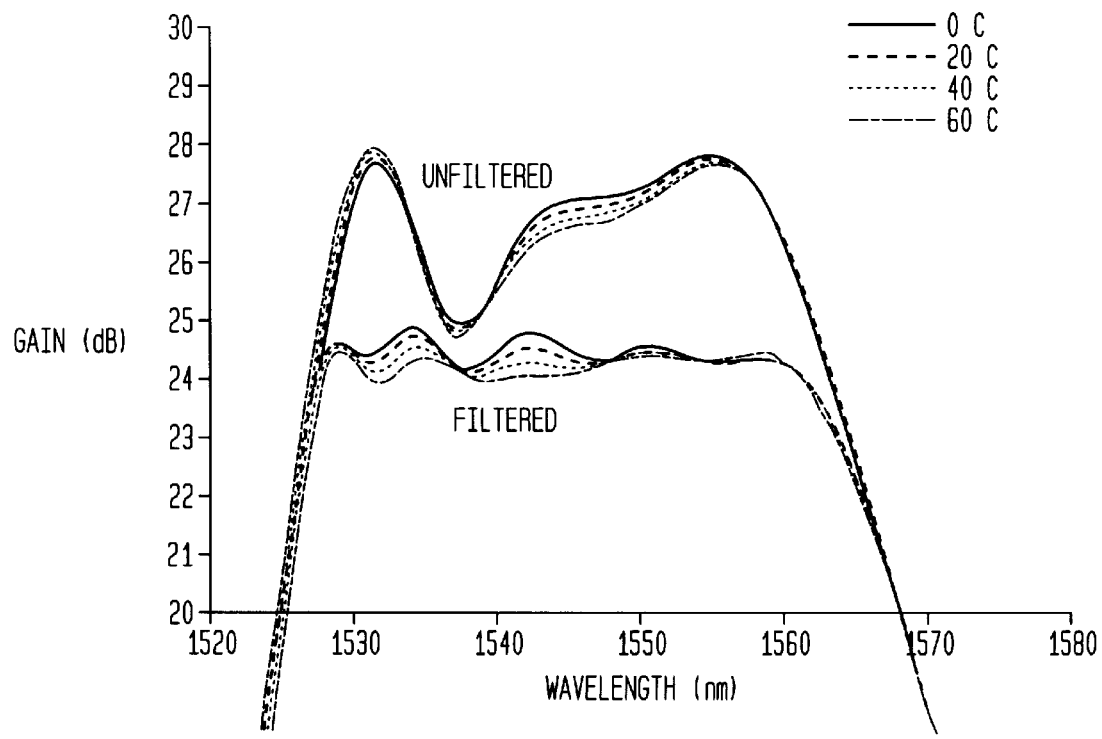

Now one can consider the addition of an attenuator to provide constant gain and output power. The result in Column 5 shows that with a variable attenuator included in the EDFA, long period gratings with individually moved centers can recover most flatness. 1.19 dB of VOA loss must be removed from the EDFA to achieve the same EDFA with VOA gain in column 5 as in column 1. (Compare 24.56 dB gain to 23.37 dB gain). FIG. 5 shows the characteristics and shift directions for the component and composite filters, and FIG. 6 shows the filtered and unfiltered amplifier gain spectra.

The loss versus wavelength characteristics of the temperature-dependent loss filter and its components are shown at various temperatures in FIG. 3. Table 3 below characterizes the appropriate packaging to achieve improved gain flatness using the filters of Table 1, with appropriate packaging ($\mu\epsilon/° C.$) to obtain the center wavelength sensitivity determined optimum from simulation. Package center wavelength shift is calculated using experimentally determined AT&T DSF temperature sensitivity ($d\lambda_p/dT$) of 54.3 pm/° C., and strain sensitivity ($d\lambda/d\epsilon$) of −615 pm/$\mu\epsilon$, for the cladding mode utilized in the LPG gratings of Table 1.

TABLE 3

| Filter # | Center Wavelength (nm) | Peak Loss (dB) | 20–60° C., no tilt | | 20–60° C., with tilt | |
|---|---|---|---|---|---|---|
| | | | packaged dλ/dT (pm/° C.) | dε/dT (με/° C.) | packaged dλ/dT (pm/° C.) | dε/dT (με/° C.) |
| 1 | 1531.2 | 2.08 | −12 | 0.1078 | −15 | 0.1127 |
| 2 | 1532.8 | 2.0 | −3 | 0.0932 | 23 | 0.0509 |
| 3 | 1546.2 | 2.5 | −18 | 0.1176 | 20 | 0.0558 |
| 4 | 1557.3 | 3.5 | 5 | 0.0802 | 18 | 0.0590 |

FIG. 4 shows the unfiltered and filtered EDFA spectrum without the variable attenuator. The 0° C. plot with about 1.2 dB of added attenuation would produce the same average gain as the 60° C. plot with 0 dB of added attenuation.

It is to be understood that the above-described embodiments are illustrative of only a few of the many possible specific embodiments which can represent applications of the principles of the invention. For example, while the specific embodiment uses long period grating filters, any optical filter in the bandwidth whose characteristic changes shape with temperature in the range R can be used as a constituent of the filter 14. This includes thin film transmission filters, biconic taper filters, and waveguide coupler filters. Thus numerous and varied other arrangements can be readily devised by those skilled in the art without departing from the spirit and scope of the invention.

What is claimed:

1. A rare earth dopant waveguide optical amplifier comprising:
   a length of optical waveguide for transmitting optical signals;
   a rare earth doped amplifying region for amplifying the transmitted optical signals, the amplifying region having a temperature-dependent gain versus wavelength characteristic;
   a pumping source for optionally pumping the amplifying region; and
   optically coupled to the waveguide, a loss filter for compensating the gain spectrum of the amplifying region over the bandwidth of the transmitted signals, said filter having a temperature-dependent loss versus wavelength characteristic, whereby said filter passively compensates the temperature dependent gain characteristic of the amplifying region.

2. The optical amplifier of claim 1 wherein said filter compensates the amplifying region to variation of less than 1 dB over a temperature range of −40° C. to 85° C. and a spectral range of at least 20 nm.

3. The optical amplifier of claim 1 wherein said loss filter comprises a plurality of filters having different center wavelength shifts with temperature.

4. The optical amplifier of claim 1 wherein said loss filter comprises a plurality of long period gratings having different center wavelength shifts with temperature.

5. The optical amplifier of claim 1 wherein the amplifying region is a length of erbium doped waveguide.

6. The optical amplifier of claim 1 wherein said waveguide comprises optical fiber.

7. The optical amplifier of claim 1 further comprising a variable optical attenuator to adjust the tilt of the amplifier gain spectrum.

8. The optical amplifier of claim 1 further comprising an optical attenuator to adjust the level of the amplifier gain spectrum.

9. An optical communication system comprising an optical transmitter, an optical receiver, an optical waveguide coupling said transmitter to said receiver and, disposed along said waveguide, an optical amplifier according to claim 1.

* * * * *